(12) United States Patent
He

(10) Patent No.: US 7,801,049 B2
(45) Date of Patent: Sep. 21, 2010

(54) METHOD, SYSTEM AND NODE FOR IMPLEMENTING SUBNETWORK CONNECTION PROTECTION IN MULTI-PROTOCOL LABEL SWITCHING NETWORK

(75) Inventor: Jia He, Guangdong (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 182 days.

(21) Appl. No.: 11/772,333

(22) Filed: Jul. 2, 2007

(65) Prior Publication Data
US 2008/0117912 A1  May 22, 2008

(30) Foreign Application Priority Data
Nov. 22, 2006  (CN)  .................. 2006 1 0145612

(51) Int. Cl.
*H04L 12/26* (2006.01)
(52) U.S. Cl. .................................... 370/241.1
(58) Field of Classification Search ................ 370/392, 370/216, 240, 241.1, 244, 245
See application file for complete search history.

(56) References Cited

U.S. PATENT DOCUMENTS

| 7,359,328 | B1 * | 4/2008 | Allan ..................... 370/236.2 |
| 7,599,303 | B2 * | 10/2009 | Nadeau et al. .............. 370/248 |
| 2003/0112749 | A1 * | 6/2003 | Hassink et al. ............. 370/225 |
| 2005/0147050 | A1 * | 7/2005 | Klink ........................ 370/244 |

FOREIGN PATENT DOCUMENTS

| CN | 1842023 A | 10/2006 |
| EP | 1833202 | 9/2007 |
| WO | 2006/069549 | 7/2006 |

OTHER PUBLICATIONS

"Protection switching for MPLS networks", ITU-T Standard Superseded (S), International Telecommunication Union, Geneva, CH, No. Y1720 4/3, Apr. 6, 2003, XP017404387.
"Operation and Maintenance mechanism for MPLS networks; Y.1711 (02/04)" ITU-T Standard in Force (I), International Telecommunication Union, Geneva, CH, No. Maintenance mechanis, Feb. 12, 2004 XP017404384.

(Continued)

*Primary Examiner*—Anh-Vu Ly
(74) *Attorney, Agent, or Firm*—Ladas & Parry LLP

(57) ABSTRACT

The embodiments of the present invention provide a method, a system and a node for implementing Subnetwork Connection Protection (SNCP) in a Multi-Protocol Label Switching (MPLS) network. The method includes: sending, by a first node of a subnetwork of the MPLS network, an Operation, Administration and Maintenance (OAM) packet on a working path and a protection path of the subnetwork respectively; determining, by a second node of the subnetwork, working status of the working path and the protection path of the subnetwork according to the OAM packet on the working path and the OAM packet on the protection path, and selecting to receive traffic from one of the working path and the protection path of the subnetwork according to the working status. In accordance with the embodiments of the present invention, the SNCP may be implemented in the Transport Multi-Protocol Label Switching (T-MPLS) network.

4 Claims, 4 Drawing Sheets

OTHER PUBLICATIONS

"Analysis of Generalized Multi-Protocol Label Switching (GMPLS)-based Recovery Mechanisms (including Protection and Restoration)" CCAMP GMPLS P&R Design Team Dimitri Papadimitriou (Editor) Eric Mannie (Editor): IETF Standard-Working-Draft, Internet Engineering Task Force, IETF, CH, vol. Ccamp, No. 5, Apr. 2005, XP015038127.

Generic protection switching—Linear trail and subnetwork protection, ITU-T Standard in Force (I), International Telecommunication Union, Geneva, CH, No. G8081 3/6, Mar. 29, 2006, XP017404637.
European Search Report dated Mar. 19, 2008; Application No./Patent No. 07252662.7-1525.
European Office Action dated Oct. 30, 2008 Application No. 07252662.7.

* cited by examiner

METHOD, SYSTEM AND NODE FOR IMPLEMENTING SUBNETWORK CONNECTION PROTECTION IN MULTI-PROTOCOL LABEL SWITCHING NETWORK

FIELD OF THE INVENTION

The present invention relates to the network communication field, and more particularly, to a method, a system and a node for implementing Subnetwork Connection Protection (SNCP) in a Multi-Protocol Label Switching (MPLS) network.

BACKGROUND OF THE INVENTION

The Subnetwork Connection Protection (SNCP) is an important protection type of a transport network. It may be a partial connection of the transport network or may be extended to an end-to-end connection of the transport network. Based on the different monitoring modes of a failure, the SNCP may be generally divided into Inherently monitored SNCP (SNC/I), Non-intrusively monitored SNCP (SNC/N) and SNCP with Sublayer monitoring (SNC/S).

The Transport Multi-Protocol Label Switching (T-MPLS) network is a packet transport network, and the SNCP may be used for guaranteeing that the traffic is able to be rapidly switched to a backup path when a working path of the T-MPLS fails.

A general linear protection switching mechanism is specified in International Telecommunication Union-Telecommunication Standardization Sector (ITU-T) recommendation G.808.1. At present, a relevant protection standard for the T-MPLS network is laid down in G.8131. However, no solution about how to implement the SNCP in the T-MPLS network is put forward yet.

SUMMARY OF THE INVENTION

Embodiments of the present invention provide a method, a system and a node for implementing Subnetwork Connection Protection (SNCP) in a Multi-Protocol Label Switching (MPLS) network.

A method for implementing SubNetwork Connection Protection (SNCP) in a Multi-Protocol Label Switching (MPLS) network includes:

sending, by a first node of a subnetwork of the MPLS network, an Operation, Administration and Maintenance (OAM) packet on a working path and a protection path of the subnetwork respectively;

determining, by a second node of the subnetwork, working status of the working path and the protection path of the subnetwork according to the OAM packet on the working path and the OAM packet on the protection path, and selecting to receive traffic from one of the working path and the protection path of the subnetwork according to the working status.

A system for implementing Subnetwork Connection Protection (SNCP) in a Multi-Protocol Label Switching (MPLS) network includes:

a first node of a subnetwork at one subnetwork edge of the MPLS network, configured to send an Operation, Administration and Maintenance (OAM) packet on a working path and a protection path of the subnetwork;

a second node of the subnetwork at the other subnetwork edge of the MPLS network, configured to determine working status of the working path and the protection path of the subnetwork according to the OAM packet received from the first node of the subnetwork and select to receive traffic from one of the working path and the protection path of the subnetwork according to the working status.

A node for implementing Subnetwork Connection Protection (SNCP) in a Multi-Protocol Label Switching (MPLS) network includes:

a first module, configured to receive a first Operation, Administration and Maintenance (OAM) packet on a working path and a protection path of the subnetwork respectively from another node;

a second module, configured to determine working status of the working path and the protection path of the subnetwork according to the first OAM packet and select to receive traffic from one of the working path and the protection path of the subnetwork according to the working status.

As can be seen from the above solutions proposed by the embodiments of the present invention, a start node of the subnetwork sends an OAM packet on a working path and a protection path of the subnetwork respectively, and an end node of the subnetwork determines the working status of the working path and the protection path according to the OAM packet received from the working path and the protection of the subnetwork, and implements protection switching based on the working status. In this way, it is possible to implement the OAM-based SNCP in the T-MPLS network, so as to improve the reliability of the T-MPLS network.

DETAILED DESCRIPTION OF THE INVENTION

Embodiments of the present invention provide a method and a system for implementing SubNetwork Connection Protection (SNCP) in a Multi-Protocol Label Switching (MPLS) network. The embodiments of this invention include: a start node of a subnetwork in an MPLS network sending an Operation, Administration and Maintenance (OAM) packet on a working path and a protection path of the subnetwork respectively; an end node of the subnetwork determining working status of the working path and the protection path of the subnetwork according to the OAM packet received from the working path and the protection path of the subnetwork.

Figure 1:
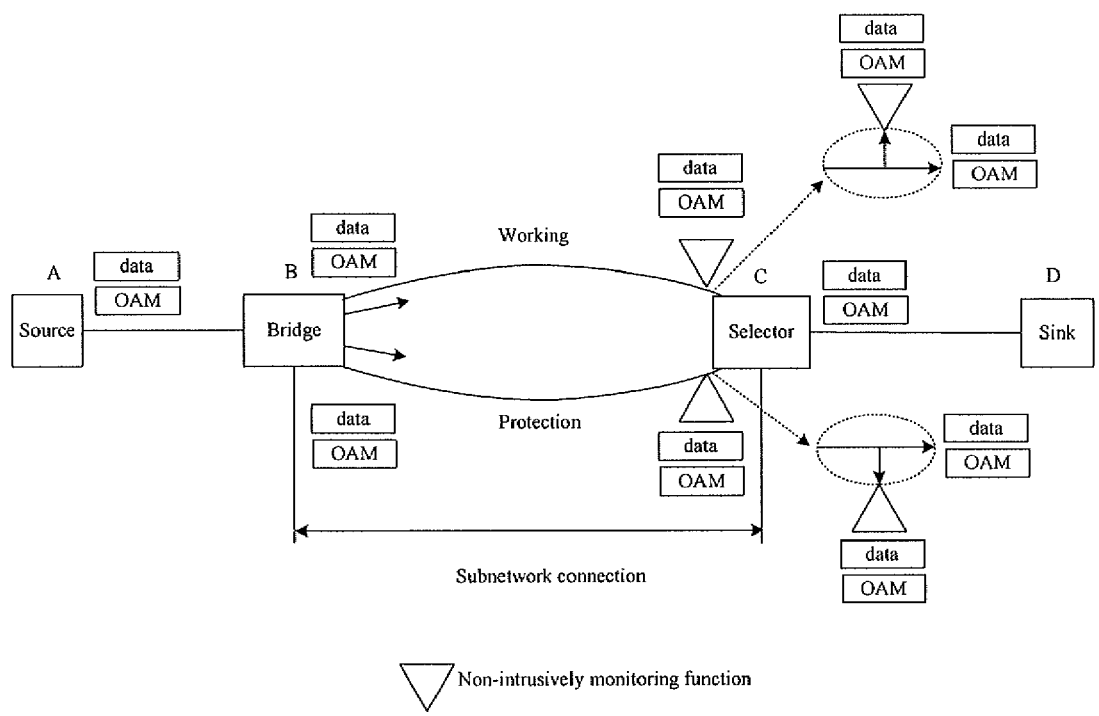
FIG. 1 is a simplified schematic diagram illustrating a basic networking structure in accordance with the method provided by an embodiment of the present invention.
Figure 2:
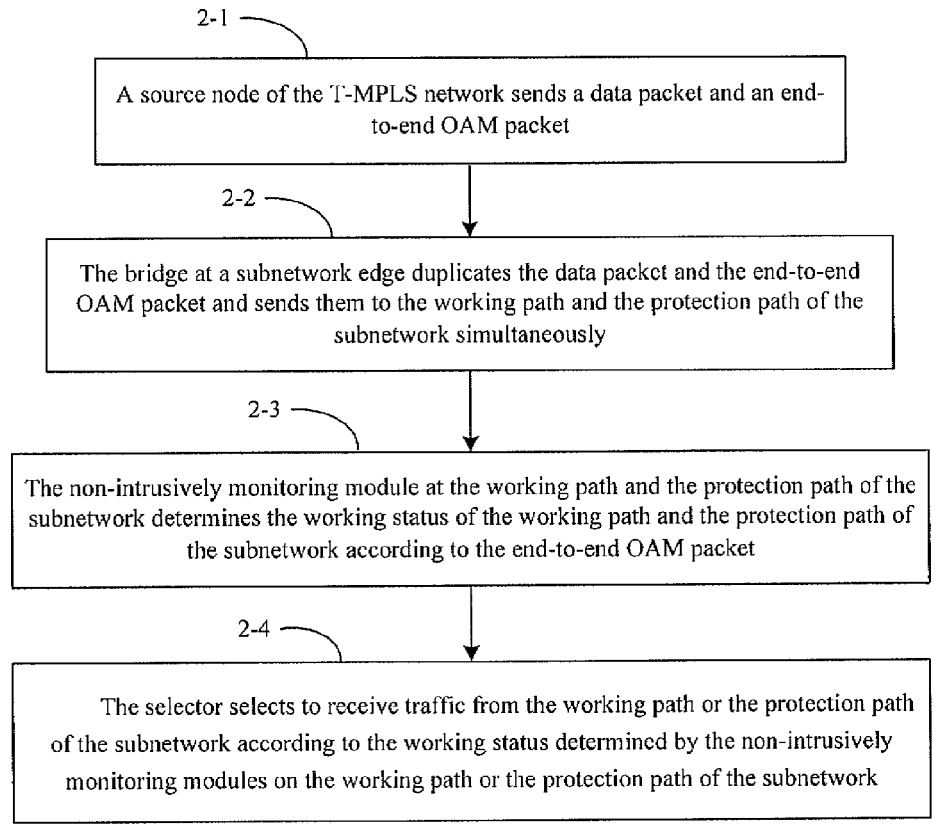
FIG. 2 is a simplified flowchart illustrating a processing procedure in accordance with the method provided by an embodiment of the present invention.

The embodiments of the present invention are described hereinafter with reference to the accompanying drawings. The method and system proposed by the embodiments of the present invention are applicable to an MPLS network including a T-MPLS network. Two embodiments in accordance with the method of the present invention are described, in which the T-MPLS network is taken as an example. One embodiment is based on an SNC/N module, a basic networking structure according to the present embodiment is as shown in FIG. 1 and a specific processing procedure is as shown in FIG. 2. The processing procedure includes the following steps.

Step 2-1: A source node of the T-MPLS network sends a data packet and an end-to-end OAM packet.

This embodiment includes: monitoring an existing OAM packet in the T-MPLS network without influence to existing traffic, determining working status of the subnetwork, and implementing subnetwork protection switching based on a determining result, which does not require an extra OAM packet. The above existing OAM packet may be an OAM packet of another management domain which crosses the subnetwork and does not belong to the subnetwork, e.g., an end-to-end OAM packet. The OAM packet of another management domain is not specifically generated for a certain subnetwork to be protected, and the area managed by the OAM packet of another management domain is generally greater than the range of the subnetwork to be protected, which is the primary difference between the solution of this embodiment and the SNC/S solution. In the embodiments of the present invention, other management domain may be a network crossing the subnetwork or a network which does not overlap with the subnetwork. The processing procedure of this embodiment is described hereinafter in which an end-to-end OAM packet is taken as an example.

In the networking of a transport network as shown in FIG. 1, one Label Switch Path (LSP) is established from Source node A to Sink node D via intermediate Node B and Node C. A subnetwork is created between Node B and Node C and subnetwork protection is supported. Node B is a start node of the subnetwork and Node C is an end node of the subnetwork. A protection switching function module is configured at a subnetwork edge. A bridge is configured at the start node of the subnetwork and is used for connecting traffic to a working path and a protection path of the subnetwork. A selector is configured at the end node of the subnetwork and is used for selecting to receive the traffic from the working path or the protection path of the subnetwork. In addition, a non-intrusively monitoring module is configured on the working path and the protection path in front of the selector respectively and used for monitoring an end-to-end OAM packet on the working path and the protection path of the subnetwork.

At first, Source node A sends to Sink node D a data packet and an end-to-end OAM packet.

Step 2-2: The bridge at a subnetwork edge duplicates the data packet and the end-to-end OAM packet and sends them to the working path and the protection path of the subnetwork simultaneously.

The data packet and the end-to-end OAM packet sent by Source node A is forwarded to Node B, e.g., an edge node of the subnetwork, along the LSP. The bridge configured at the start node of the subnetwork receives the data packet and the end-to-end OAM packet.

After duplicating the data packet and end-to-end OAM packet, the bridge configured at the start node of the subnetwork sends them to the working path and the protection path of the subnetwork simultaneously, i.e., bicast is performed.

Step 2-3: the non-intrusively monitoring module on the working path of the subnetwork and the non-intrusively monitoring module on the protection path of the subnetwork determine the working status of the working path and the protection path of the subnetwork respectively according to the end-to-end OAM packet.

The data packet and the end-to-end OAM packet sent by the bridge to the working path and the protection path of the subnetwork arrive at Node C, i.e., another edge node of the Subnetwork, along the LSP. The non-intrusively monitoring module on the working path receives the data packet and the end-to-end OAM packet from the working path and the non-intrusively monitoring module on the protection path receives the data packet and the end-to-end OAM packet from the protection path.

The non-intrusively monitoring module on the working path and the protection path firstly distinguishes the received traffic (including data packets and OAM packets), and extracts the end-to-end OAM packet. The method of distinguishing the OAM packet from the data packet adopted by the non-intrusively monitoring module is similar to the operation of a Sink node of the LSP, and specifically includes: checking whether the bottom of the label stack in the received packet is a special label representing an OAM packet (e.g., Label 14 represents an OAM packet). If no, the packet is a data packet, and the non-intrusively monitoring module discards the data packet without processing; otherwise, the packet is an OAM packet, and the non-intrusively monitoring module further performs failure detection using the OAM packet, and determines whether the working path or the protection path of the subnetwork fails according to a failure detection result.

The method for the non-intrusively monitoring module performing the failure detection for the OAM packet includes: Continuity and Connectivity check and performance monitoring. In an example of the continuity detection, if the OAM packet is not received within three continuous OAM packet sending periods, the non-intrusively monitoring module on the working path or the protection path of the subnetwork considers that a continuity failure occurs in the working path or the protection path. If the information of the LSP to be detected (e.g., an LSP Identity (ID) and a Source Label Switching Router (LSR) ID) is configured in the non-intrusively monitoring module, the non-intrusively monitoring module may further determine whether a connectivity failure occurs in the working path or the protection path of the subnetwork.

Referring to FIG. 1, the non-intrusively monitoring module on the working path monitors the failure status of the path from A to B, and then to C through the working path of the subnetwork; the non-intrusively monitoring module on the protection path of the subnetwork monitors the failure status of the path from A to B, and then to C via the protection path of the subnetwork.

To sum up, the non-intrusively monitoring module on the working path or the protection path of the subnetwork may perform the failure detection according to a triggering condition of the protection switching, so as to determine the working status of the working path or the protection path of the subnetwork.

Step 2-4: the selector selects to receive traffic from the working path or the protection path of the subnetwork according to the working status determined by the non-intrusively monitoring module on the working path and the protection path of the subnetwork.

After the non-intrusively monitoring module on the working path determines the working status of the working path and the non-intrusively monitoring module on the protection path determines the working status of the protection path, the selector selects to receive the traffic from the working path or the protection path of the subnetwork according to the working status of the working path and the protection path of the subnetwork, and continuously transmits the traffic along the LSP until the traffic arrives at the Sink node of the LSP.

The method for the selector selecting a path to receive the traffic is as follows.

The selector receives the traffic from the working path of the subnetwork in a default mode.

If the non-intrusively monitoring module on the working path of the subnetwork detects that there is no failure in the working path of the subnetwork, the traffic is not switched, and the selector receives the traffic from the working path of the subnetwork.

If the non-intrusively monitoring module on the working path of the subnetwork detects that there is a failure in the working path of the subnetwork and the non-intrusively monitoring module on the protection path of the subnetwork detects that no failure occurs in the protection path of the subnetwork, the traffic is switched, and the selector receives the traffic from the protection path of the subnetwork.

If both the non-intrusively monitoring module on the working path and the protection path of the subnetwork respectively detect that a failure occurs, the traffic is not switched, but is unable to be transmitted normally.

Figure 3:
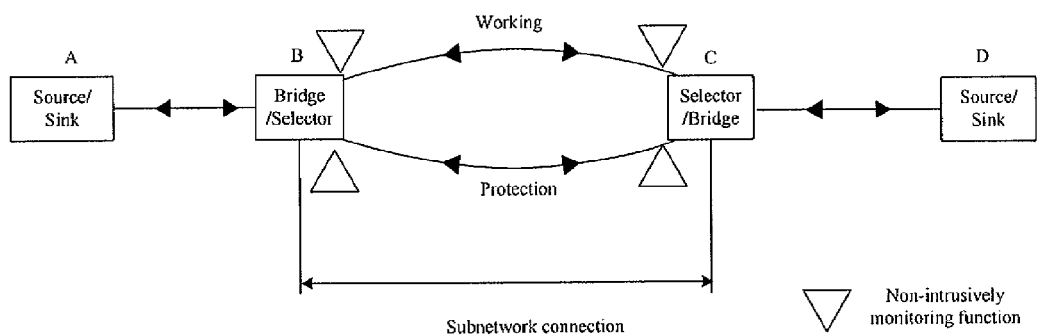
FIG. 3 is a simplified schematic diagram illustrating a networking solution of bidirectional path in accordance with the method provided by an embodiment of the present invention.

If the working path of the subnetwork is bidirectional, it is necessary to configure the non-intrusively monitoring module at both subnetwork edges. A simplified schematic diagram illustrating a networking solution of bidirectional path is as shown in FIG. 3. The non-intrusively monitoring module is configured at Node B and Node C and monitors the end-to-end OAM in two directions respectively. The operation of the bridge, non-intrusively monitoring module and selector is the same as that for the unidirectional path.

Figure 4:
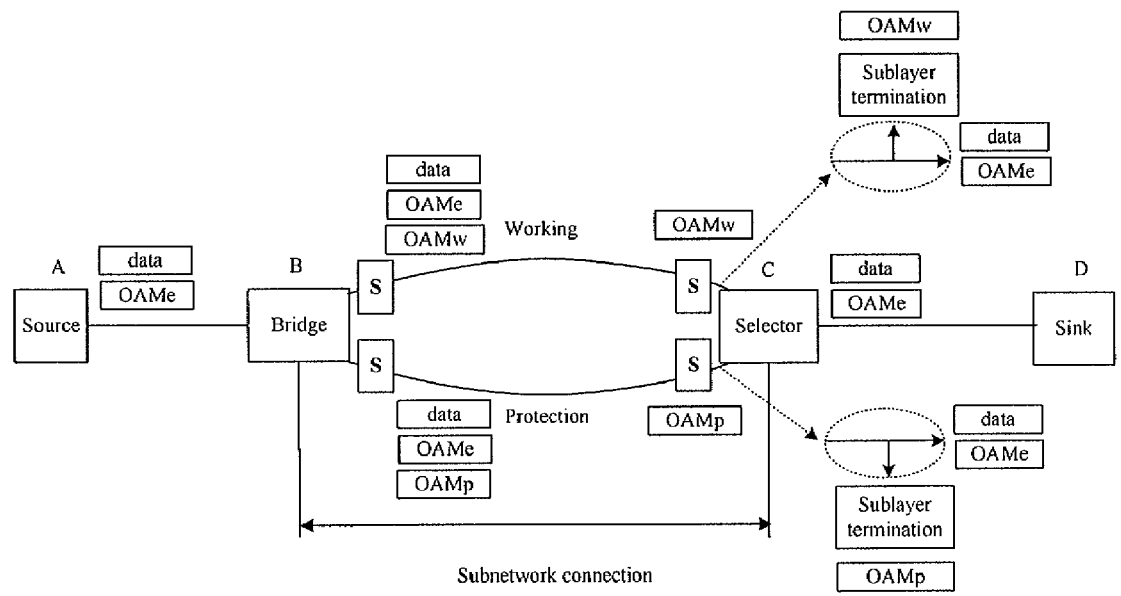
FIG. 4 is a simplified schematic diagram illustrating a basic networking structure in accordance with the method provided by another embodiment of the present invention.
Figure 5:
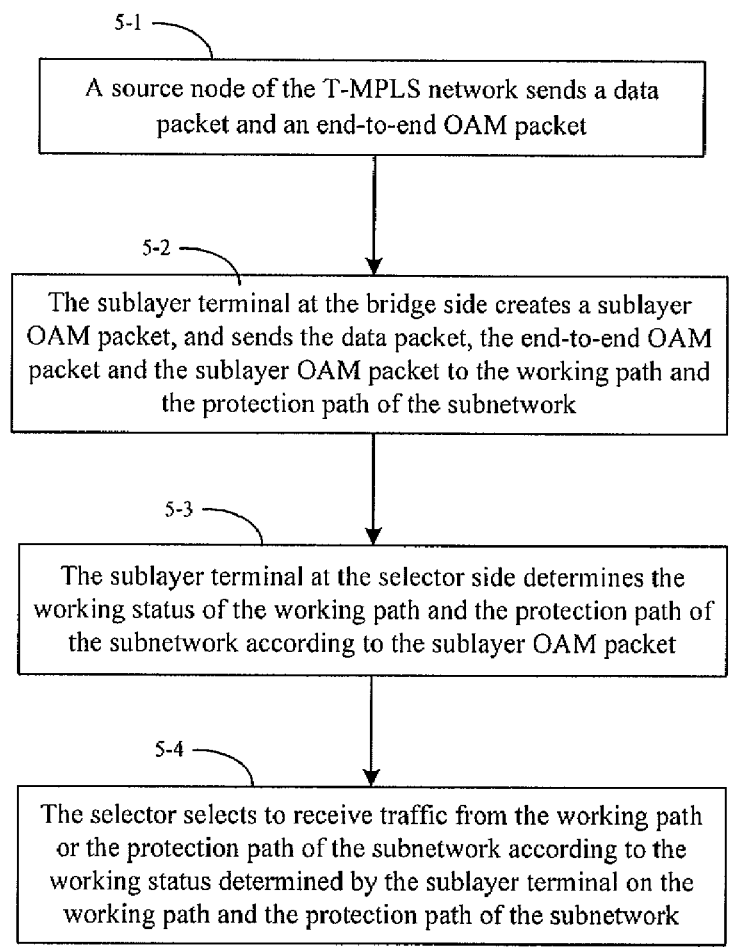
FIG. 5 is a simplified flowchart illustrating a processing procedure in accordance with the method provided by another embodiment of the present invention.

Based on the SNC/S model, a basic networking structure according to another embodiment is as shown in FIG. 4. A processing procedure of this embodiment is as shown in FIG. 5, and includes the following steps.

Step 5-1: A source node of the T-MPLS network sends a data packet and an end-to-end OAM packet.

The basic principle of this embodiment is to implement subnetwork protection by means of a sublayer OAM packet, i.e., construct a dedicated protection sublayer for the subnetwork to be protected and creating a sublayer OAM packet for detecting subnetwork failure. Since the sublayer OAM packet is relatively independent to an OAM packet of another management domain, e.g., an end-to-end OAM, more complicated detections may be implemented as demanded, for example failure detection, failure locating and performance monitoring. The processing procedure of this embodiment is described hereinafter by taking an end-to-end OAM packet as an example.

In the networking of a transport network as shown in FIG. 4, one Label Switch Path (LSP) is established from Source node A to Sink node D via intermediate Node B and Node C. A subnetwork is created between Node B and Node C and subnetwork protection is supported. A protection switching function module is configured at a subnetwork edge. Node B is a start node of the subnetwork and Node C is an end node of the subnetwork. A bridge is configured at the start node of the subnetwork and is used for connecting traffic to a working path and a protection path of the subnetwork. A selector is configured at the end node of the subnetwork and is used for selecting to receive the traffic from the working path or the protection path of the subnetwork. In addition, two sublayer terminals (as shown in FIG. 4 by means of a block labeled by Letter S) are configured behind the bridge, one is on the working path of the subnetwork and the other is on the protection path; two sublayer terminals are configured in front of the selector, one is on the working path of the subnetwork, and the other is on the protection path. The sublayer terminals are used for creating sublayer OAM packets and detecting the sublayer OAM packets.

Source node A sends to Sink node D a data packet and an end-to-end CAM packet (OAMe).

Step 5-2: The two sublayer terminals at the bridge side create a sublayer OAM packet, and send the data packet, the end-to-end OAM packet and the sublayer OAM packet to the working path and the protection path of the subnetwork respectively.

The data packet and end-to-end OAM packet sent by Source node A are forwarded to Node B, i.e., an edge node of the subnetwork, along the LSP. The two sublayer terminals configured at the bridge side receive the data packet and the end-to-end OAM packet.

The two sublayer terminals configured at the bridge side create the sublayer OAM packet according to the received end-to-end OAM packet or create the sublayer OAM packet independent of the end-to-end OAM packet. The sublayer OAM packet includes an OAM packet of the working path of the subnetwork (OAMw) and an OAM packet of the protection path of the subnetwork (OAMp). The sublayer terminals differentiate and process the created sublayer OAM packet and the end-to-end OAM packet respectively. The scheme for implementing the differentiating and processing includes the following types.

For example, a scheme for differentiating and processing by means of a label stack is described hereinafter.

In the networking of a transport network as shown in FIG. 4, the sublayer terminals configured at Node B side, i.e., an edge node of the subnetwork, create a sublayer OAM packet according to a current OAM rule of networks. The OAM rule includes representing an OAM packet by Label 14 at the bottom of a label stack. The sublayer OAM packet is processed at the sublayer end with the same processing rule for an end-to-end OAM packet processed at the sink node of the network, which includes removing an external layer forwarding label, determining that it is an OAM packet according to Label 14, and determining whether a failure occurs according to the content of the OAM packet.

To guarantee that the end-to-end OAM (OAMe) passes through the subnetwork transparently, a label stack method is used to shield it. When the OAMe packet enters into the subnetwork, a layer of new label for indicating that the OAMe packet does not belong to the subnetwork is created, i.e., shield the OAMe packet from the subnetwork. When the OAMe packet leaves the subnetwork, the edge node of the subnetwork determines that the OAMe packet does not belong to the subnetwork according to the layer of new label and does not process the OAMe but removes the layer of new label and continues to forward the OAMe packet. The layer of new label is used for distinguishing the sublayer OAM packet from other OAM packets which do not belong to the sublayer. The layer of new label may be a special label under an external layer forwarding label or may be a sublayer forwarding label.

For another example, a scheme for differentiating and processing by means of a parameter field in a payload of an OAM packet is described hereinafter.

A parameter field is introduced into the payload of the OAM packet in this scheme, and different values represent different OAM hierarchy relations; additionally, it is necessary to configure hierarchy relation information at an end node of a corresponding layer. For example, an end-to-end OAM (OAMe) packet may be represented by a parameter value 7, and the hierarchy relation information of the OAMe is configured at Node A and Node D of the LSP. A sublayer OAM (OAMw or OAMp) packet may be represented by a parameter value 3, and the information of the sublayer OAM packet is configured at the sublayer terminal. If the configured hierarchy information matches the parameter in the received OAM packet, Node A and the sublayer terminal process the received OAM packet, otherwise, they transmit the received OAM packet transparently.

For example, when an OAMe (the parameter value is 7) packet passes through the subnetwork, the sublayer terminal does not process the OAMe packet because the parameter value configured at the sublayer terminal is 3 (not equal to 7), and transmits the OAMe packet transparently. When a sublayer OAM packet (the parameter value is 3) passes through the subnetwork, the sublayer terminal processes the sublayer OAM packet because the parameter value in the sublayer OAM packet and the parameter value configured at the sublayer terminal are the same.

For another example, a scheme for differentiating and processing by means of a special field of a packet header hereinafter, e.g., Time To Live (TTL) of a label field or an Experimental Use (EXP) field for Experimental Use. The format of the packet header with the special field is as shown in Table 1.

TABLE 1 a simplified schematic table for the packet header

| Label(20 bits) | EXP(3 bits) | S(1 bit) | TTL(8 bits) |
| --- | --- | --- | --- |

For example, the TTL value of the packet header may be configured to distinguish an OAMe packet from a sublayer OAM packet. In the network as shown in FIG. 4, it is supposed that there are 4 hops from Node B to Node C via the working path of the subnetwork, 5 hops from Node B to Node C through the protection path of the subnetwork, 10 hops for the end-to-end OAM packet passing through the working path of the subnetwork and 11 hops for the end-to-end OAM packet passing through the protection path of the subnetwork, the TTL value of the OAMe packet should be greater than or equal to the maximal number of hops for reaching the Sink end via the working path and the protection path of the subnetwork so as to guarantee that the OAMe packet is able to arrive at the Sink end of the LSP.

As a result, the TTL value of the OAMe packet is set as greater than or equal to 11 so as to guarantee that the OAMe packet is able to arrive at Sink end D of the LSP. The TTL value of the OAMw packet on the working path of the subnetwork is set as 4 and the TTL value of the OAMp packet on the protection path of the subnetwork is set as 5, which may guarantee that the sublayer OAM packet terminates at the subnetwork edge.

The OAMe packet, OAMw packet and OAMp packet may be different from each other only in the TTL values, i.e., the OAMw packet and the OAMp packet may be acquired by copying the OAMe packet and only modifying the TTL values, and other packet contents thereof are the same. Alternatively, the OAMe packet, OAMw packet and OAMp packet may be independent from each other, i.e., the packet contents of the OAMe packet, OAMw packet and OAMp packet are different, and the OAMw packet and the OAMp packet are created independently instead of being created according to the OAMe packet.

In this scheme, each node in the network is required to know the location relation with other nodes, e.g., the number of hops between other nodes and itself, which may be implemented in the T-MPLS network.

In addition, the sublayer OAM packet may be distinguished from the end-to-end OAM packet by setting the EXP as different values.

After creating the sublayer OAM packet and performing the above differentiating and processing, the sublayer terminal at the bridge side sends the data packet, the end-to-end OAM packet and the OAMw packet to the working path of the subnetwork, and sends the data packet, the end-to-end OAM packet and the OAMp packet to the protection path of the subnetwork.

Step 5-3: the sublayer terminal at the selector side determines the working status of the working path and the protection path of the subnetwork according to the received sublayer OAM packet.

The data packet, the end-to-end OAM packet and the sublayer OAM packet sent by the sublayer terminal at the bridge side on the working path and the protection path of the subnetwork arrive at Node C, i.e., an edge node of the subnetwork, along the LSP. The sublayer terminal at the selector side receives the data packet, the end-to-end OAM packet and the sublayer OAM packet.

The sublayer terminal at the selector side distinguishes the received various packets according to the above schemes for implementing the differentiating and processing, for example, according to the label stack, extracts the sublayer OAM packet, e.g., an OAMw packet or an OAMp packet, and then performs the failure detection for the OAMw packet or OAMp packet so as to determine whether the working path or the protection path of the subnetwork fails.

The method for the sublayer terminal determining and detecting the sublayer OAM packet failure is the same as the method for the non-intrusively monitoring module detecting the OAM packet failure described in the forgoing embodiment.

Step 5-4: the selector selects to receive traffic from the working path or the protection path of the subnetwork according to the working status of the working path and the protection path of the subnetwork determined by the sublayer terminal.

After the sublayer terminal at the selector side determines the working status of the working path and the protection path of the subnetwork, the selector selects to receive the traffic from the working path or the protection path of the subnetwork according to the working status of the working path and the protection path of the subnetwork, and transmits the traffic along the LSP until the traffic arrives at the Sink node of the LSP.

In this embodiment, the method for the selector selecting to receive the traffic is the same as that described in the forgoing embodiment.

If the working path is bidirectional, it is possible to implement the method for the selector selecting to receive the traffic by respectively using a unidirectional path scheme in the two directions.

Figure 6:
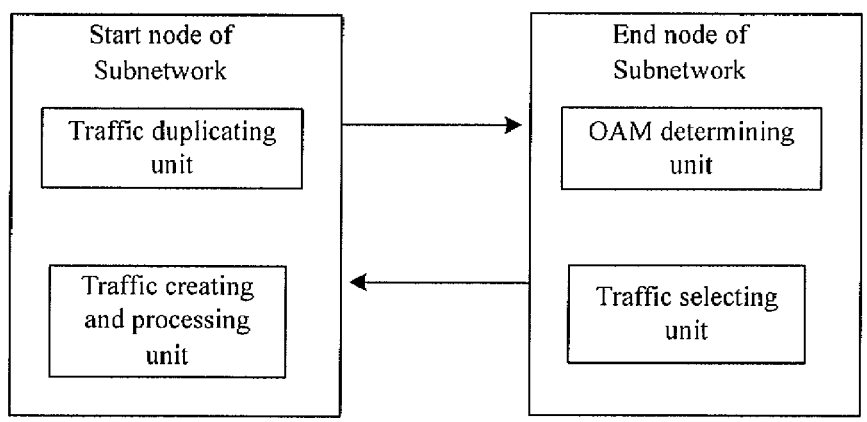
FIG. 6 is a simplified schematic diagram illustrating a system in accordance with embodiments of the present invention.

A simplified schematic diagram for illustrating a system according to an embodiment of the present invention is as shown in FIG. 6, which takes a T-MPLS network as an example and includes the following modules.

A start node of a subnetwork configured at the subnetwork edge in the T-MPLS network, for sending an OAM packet and a data packet on a working path and a protection path of the subnetwork. The start node includes a traffic duplicating unit and a traffic creating and processing unit.

The traffic duplicating unit corresponds to the bridge in FIG. 1, and is used for sending the data packet and an OAM packet of another management domain simultaneously on the working path and the protection path of the subnetwork after duplicating the data packet and the OAM packet of another management domain. The OAM packet of another management is a packet crossing the subnetwork.

The traffic creating and processing unit corresponds to the sublayer terminal in FIG. 4, and is used for creating a sublayer OAM packet while sending the data packet and the OAM packet of another management domain; differentiating and processing the sublayer OAM packet and the OAM packet of another management domain respectively; sending a working sublayer OAM packet on the working path of the subnetwork and sending a protection sublayer OAM packet on the protection path of the subnetwork.

An end node of the subnetwork configured at the subnetwork edge in the T-MPLS network, for determining the working status of the working path and the protection path of the subnetwork according to the OAM packet sent by the start node of the subnetwork and selecting to receive traffic from the working path or the protection path of the subnetwork. The end node includes an OAM determining unit and a traffic selecting unit.

The OAM determining unit is used for extracting the OAM packet of another management domain or the sublayer OAM packet from all packets received by the working path and the protection path of the subnetwork, and determining the working status of the working path and the protection path of the subnetwork according to the extracted OAM packet of another management domain or the sublayer OAM packet.

The traffic selecting unit is used for selecting to receive traffic from the working path or the protection path of the subnetwork according to the working status of the working path and the protection path of the subnetwork determined by the OAM determining unit.

The foregoing is only preferred embodiments of the present invention. The protection scope of the present invention, however, is not limited to the above description. Any change or substitution, within the technical scope disclosed by the present invention, easily occurring to those skilled in the art should be covered by the protection scope of the present invention. Therefore, the protection scope of the present invention should be compatible with the protection scope stated by claims.

What is claimed is:

1. A method for implementing Subnetwork Connection Protection (SNCP) in a Multi-Protocol Label Switching (MPLS) network, wherein the MPLS network nests a subnetwork and a source node of the MPLS network sends an Operation, Administration and Maintenance (OAM) packet; the source node is part of the MPLS network without being part of the subnetwork, the method comprising:

duplicating, by a first node of the subnetwork, the OAM packet sent by the source node of the MPLS network and modifying a Time To Live (TTL) value in the field of the OAM packet to generate an OAMw packet and an OAMp packet, wherein the TTL value in the field of the OAMw packet is equal to the number of hops of a working path and the TTL value in the field of the OAMp packet is equal to the number of hops of a protection path; wherein the TTL value in the field of the OAM packet is set as greater than or equal to the maximal number of hops of the MPLS network via a working path and a protection path of the subnetwork;

sending by the first node of the subnetwork, the OAM packet and the OAMw packet onto the working path of the subnetwork and sending the OAM packet and the OAMp packet onto the protection path of the subnetwork;

distinguishing, by a second node of the subnetwork, the OAMw packet and the OAM packet according to the TTL value in the field of the OAMw packet and the TTL value in the field of the OAM packet, and distinguishing the OAMp packet and the OAM packet according to the TTL value in the field of the OAMp packet and the TTL value in the field of the OAM packet; and determining, by the second node of the subnetwork, working status of the working path and the protection path of the subnetwork according to the OAMw packet on the working path and the OAMp packet on the protection path, selecting to receive traffic from one of the working path and the protection path of the subnetwork according to the working status, and transmitting the OAM packet transparently.

2. The method of claim 1, wherein the MPLS network is a Transport Multi-Protocol Label Switching (T-MPLS) network.

3. A system for implementing Subnetwork Connection Protection (SNCP) in a Multi-Protocol Label Switching (MPLS) network, wherein the MPLS network nests a subnetwork and a source node of the MPLS network sends an Operation, Administration and Maintenance (OAM) packet; the source node is part of the MPLS network without being part of the subnetwork, the system comprising:

a first node of the subnetwork at one edge of the subnetwork, configured to duplicate the OAM packet sent by the source node of the MPLS network and modify a Time To Live (TTL) value in the field of the OAM packet to generate an OAM packet of a working path of the subnetwork, OAMw packet, and an OAM packet of a protection path of the subnetwork, OAMp packet, wherein the TTL value in the field of the OAMw packet is equal to the number of hops of the working path and the TTL value in the field of the OAMp packet is equal to the number of hops of the protection path; send the OAM packet and the OAMw packet onto the working path and send the OAM packet and the OAMp packet onto the protection path of the subnetwork;

a second node of the subnetwork at the other edge of the subnetwork, configured to distinguish the OAMw packet and the OAM packet according to the TTL value in the field of the OAMw packet and the TTL value in the field of the OAM packet, distinguish the OAMp packet and the OAM packet according to the TTL value in the field of the OAMp packet and the TTL value in the field of the OAM packet; determine working status of the working path and the protection path of the subnetwork according to the OAMw packet on the working path and the OAMp packet on the protection path, select to receive traffic from one of the working path and the protection path of the subnetwork according to the working status, and transmit the OAM packet transparently.

4. The system of claim 3, wherein the MPLS network is a Transport Multi-Protocol Label Switching (T-MPLS) network.

* * * * *